United States Patent [19]

Kayalioglu

[11] 3,822,385

[45] July 2, 1974

[54] NOISE PULSE REJECTION CIRCUIT

[75] Inventor: Inanc Kayalioglu, Ottawa, Ontario, Canada

[73] Assignee: Bell-Northern Research Ltd., Ottawa, Ontario, Canada

[22] Filed: Sept. 14, 1973

[21] Appl. No.: 397,406

[52] U.S. Cl. .................................. 307/234, 328/111

[51] Int. Cl. .................................................. H03k 5/20

[58] Field of Search ............. 307/234; 328/111, 112

[56] References Cited

UNITED STATES PATENTS

| | | | |
|---|---|---|---|
| 2,666,135 | 1/1954 | Barton | 328/111 |
| 3,132,263 | 5/1964 | Maass | 328/112 |
| 3,219,838 | 11/1965 | Hurst | 307/234 |
| 3,387,221 | 6/1968 | Arberman et al. | 307/234 |
| 3,693,101 | 9/1972 | Trimble | 307/234 |

*Primary Examiner*—Stanley D. Miller, Jr.
*Attorney, Agent, or Firm*—Frank Turpin

[57] ABSTRACT

A circuit for rejecting pulses having a width less than a predetermined amount uses a single amplifier. The pulses are fed to the amplifier through a resistance-capacitance charging circuit. The resistance element is shunted by a pair of switched low impedance circuits which are controlled by the output signal of the amplifier to selectively permit current flow through only one of the circuits.

7 Claims, 6 Drawing Figures

NOISE PULSE REJECTION CIRCUIT

This invention relates to a pulse circuit and more particularly to a circuit fo rejecting pulses having a width less than a predetermined amount.

A perpetual problem in data transmission is the occurence of extraneous or noise pulses on the transmission line. These unwanted pulses tend to cause false triggering and erroneous reception at the receiver end of a transmission path. It is therefore desirable that these unwanted pulses be recognized and their effect on the data receiver be cancelled.

This problem was recognized some time ago and a number of circuits have been designed to solve the problem. The most common prior art circuit comprises three discrete stages connected in series. Each stage comprises a unidirectional current device, a charging circuit and an operational amplifier. The first stage cancels the effect of positive going noise pulses and the second stage cancels the effect of negative going noise pulses. However, the cancelling process of the first two stages also results in time distortion of the wanted pulses. Therefore, a third stage is needed to readjust the pulses to their original width.

I have invented a circuit which rejects pulses having a width less than a predetermined amount and which exhibits marked advantages over the prior art circuits. For example, my circuit does not vary the width of the pulses passing through it, thereby obviating the need for a circuit section to compensate therefor. In addition, the total delay of a pulse passing through the circuit is equal to the maximum width of the pulses to be rejected. Also, since the charging circuit portion of the circuit of the invention is common to the rejection of both positive and negative pulses, only one close-tolerance component is needed. In view of its simplicity, the circuit of the invention is therefore more economical to manufacture than the prior art circuits.

In accordance with the invention, there is provided an input terminal for connection to a source of pulses. An operational amplifier has its inverting input connected to the input terminal through a resistance element. The inverting input is also connected, through a capacitance element, to the non-inverting input of the amplifier and to an output port for connection to a source of reference potential. A pair of oppositely poled unidirectional current devices are connected in parallel and across the resistance element. A pair of switch means are each connected in series with a respective one of the unidirectional devices and are responsive to the signal appearing on the output terminal of the amplifier for selectively permitting current flow through the devices.

Figure 1A:
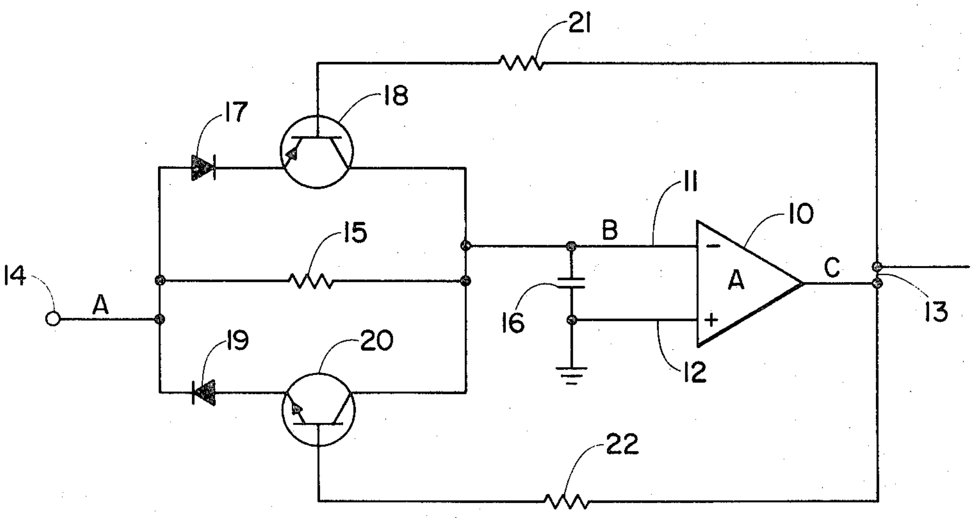
Figure 1B:
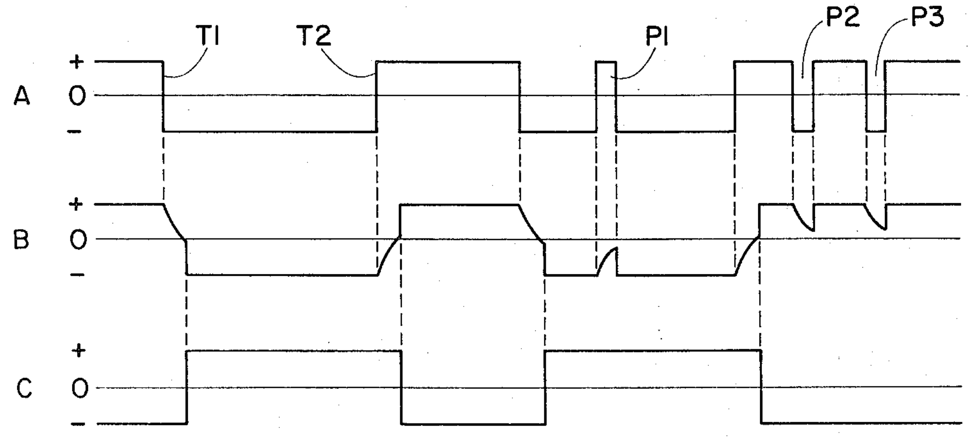

An example embodiment of the invention will now be described in conjunction with the drawings in which:

FIG. 1*a* is a pulse rejection circuit in accordance with the invention;

FIG. 1*b* is a diagram illustrating the waveforms at different points in the circuit of FIG. 1*a;*

FIGS. 2*a*, 2*b*, 2*c* and 2*d* are circuits illustrating various alternate embodiments of a portion of the circuit of FIG. 1*a*.

FIG. 1*a* shows an operational amplifier 10 connected as an inverting amplifier and having an inverting input 11, a non-inverting input 12 and an output terminal 13. The inverting input 11 is connected to an input terminal 14 through a resistance element 15 and to the grounded non-inverting input 12 through a capacitance element 16. The non-inverting input 12 is shown connected to ground; however, it should be understood that ground is in reality only a reference potential which may be a positive or negative value. A diode 17 has its anode connected to the input terminal 14 and its cathode connected to the emitter electrode of a transistor 18 whose collector electrode is connected to the inverting input 11 of amplifier 10. Similarly, a diode 19 has its cathode connected to the input terminal 14 and its anode connected to the emitter electrode of a transistor 20 whose collector electrode is connected to the inverting input 11 of amplifier 10. The base electrodes of transistors 18 and 20 are connected through respective base biasing resistors 21 and 22 to the output terminal 13. It should be noted that diodes 17 and 19 are poled oppositely and in the same direction as the emitter-base junction of their respective transistor. Hence, it is necessary that the transistors 18 and 20 be of opposite type. In the embodiment illustrated, transistor 18 is of the PNP type and transistor 20 is of the NPN type.

The operation of the circuit of FIG. 1*a* will now be described using the waveforms illustrated in FIG. 1*b*. Waveforms A, B and C illustrate the signals appearing at correspondingly identified points in the circuit. Waveform A shows the signal which may be applied to input terminal 14. Waveform B shows the signal appearing at the input 11 of amplifier 10 whereas waveform C shows the signal appearing at the output terminal 13. In the following description, references to positive and negative signals will be with respect to ground since that is the reference potential which is shown connected to the non-inverting input 12 of amplifier 10 in FIG. 1A.

Let us assume that the input signal is positive. Under this condition the output signal of amplifier 10 is negative, thereby biasing transistor 18 into conduction and shunting resistance element 15 with the low impedance series circuit of diode 17 and transistor 18. Also, transistor 20 is biased off.

Let us now assume that the input signal becomes negative as shown in FIG. 1*b* at T1. The diode 17 is now reverse-biased and the capacitor 16 starts to discharge through the resistance element 15. When the voltage at the inverting input 11 of amplifier 10 goes negative, its output signal goes positive, thereby biasing transistor 20 into conduction and shunting the resistance element 15 with the low impedance series circuit of diode 19 and transistor 20. This action is illustrated in waveforms B and C.

When the input signal changes from negative to positive, such as at T2, the reverse procedure takes place. The diode 19 is reverse biased and the resistance element 15 is not shunted by the low impedance series circuit of diode 17 and transistor 18 until the voltage level at the inverting input 11 of amplifier 10 has reached a positive level.

Let us now assume that a noise pulse P1 appears while the input signal is negative. Under this condition, the resistance element 15 is shunted with the low impedance series circuit of diode 19 and transistor 20. When the positive going noise pulse P1 appears, the diode 19 is reverse biased and the capacitor 16 starts to discharge through the resistance element 15. If the time required for the level at the input 11 of amplifier 10 to become positive is longer than the width of the noise pulse, the diode 19 becomes forward biased at the falling edge of the noise pulse and the signal at the output terminal 13 of the amplifier 10 remains positive. Therefore the noise pulse P1 has had no effect on the output signal on terminal 13.

Similarly, if negative going noise pulses such as P2 and P3 occur while the input signal is positive the signal at the output terminal 13 of amplifier 10 remains negative.

Of course, only pulses having a width less than a predetermined amount are rejected by the circuit. The maximum width of the pulses to be rejected may be varied by varying the values of the components comprising the charging circuit, that is resistance element 15 and capacitance element 16. Since the charging circuit is common to the rejection of negative and positive noise pulses, the transmitted pulses are delayed as in the prior art circuits but their width is not modified. Furthermore, in order to obtain accurate timing, only one of the components of the charging circuit needs to be selected in the manufacture of the circuit. Alternately, adjustable components such as variable resistance may be used. It should also be noted that the total delay of a pulse passing through the circuit is equal to the maximum width of the pulses to be rejected.

Figure 2A:
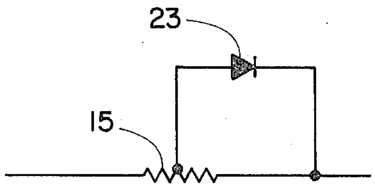
Figure 2B:
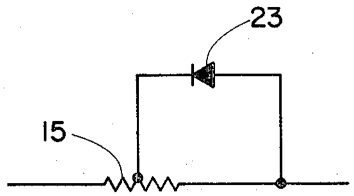

FIGS. 2*a*, 2*b*, 2*c* and 2*d* illustrate various embodiments of the resistance element 15 shown in FIG. 1*a*. FIGS. 2*a* and 2*b* each show the resistance element 15 having a diode 23 connected across a portion thereof. These diodes serve to vary the rise and fall times of the charging circuit. Using these circuits, it is possible to reject negative noise pulses having a width different from that of the positive noise pulses being rejected. The same result may be obtained by varying the reference voltage at the non-inverting input 12 of amplifier 10.

Figure 2C:
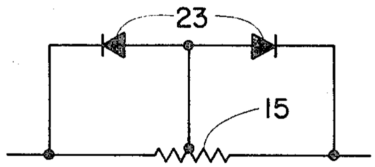

In some cases, it may be desirable to combine the circuits of FIGS. 2*a* and 2*b*, such as shown in FIG. 2*c*.

Figure 2D:
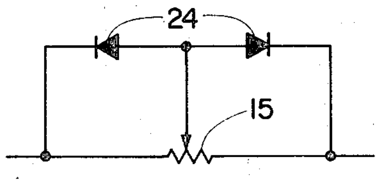

FIG. 2*d* shows the resistance element 15 of FIG. 1*a* as being a potentiometer having a pair of oppositely poled diodes 24 connected in parallel therewith. The junction of the diodes is connected to the adjustable terminal of the potentiometer. This embodiment provides for a field adjustment of the charging circuit.

As may be seen from the above description, the invention provides a flexible and easily adjustable circuit which is economical to manufacture.

What is claimed is:

1. A pulse rejection circuit comprising:

an input terminal for connection to a source of pulses;

an operational amplifier having an output terminal, an inverting input, and a non-inverting input;

a resistance element connected between the input terminal and said inverting input;

a capacitance element having one end connected to said inverting input, and the other end connected to said non-inverting input and to an output port for connection to a source of reference potential;

a pair of oppositely poled unidirectional current devices connected in parallel and across said resistance element;

a pair of switch means, each one connected in series with a respective one of said devices, said switch means being responsive to the signal appearing on said output terminal for selectively permitting current flow through said devices.

2. A circuit as defined in claim 1 wherein said unidirectional current devices are diodes.

3. A circuit as defined in claim 2 wherein said switch means are bipolar transistors.

4. A pulse rejection circuit comprising:

an input terminal for connection to a source of pulses;

an operational amplifier having an output terminal, an inverting input, and a non-inverting input;

a resistance element connected between the input terminal and said inverting input;

a capacitance element having one end connected to said inverting input, and the other end connected to said non-inverting input and to an output port for connection to a source of reference potential;

a pair of opposite type bipolar transistors having their base electrodes connected to said output terminal, their collector electrodes connected to said inverting input, and their emitter electrodes connected to said input terminal through a respective diode, said diodes being poled in the same direction as the emitter-base junction of their respective transistor.

5. A circuit as defined in claim 4, further comprising a third diode connected across a first portion of said resistance element.

6. A circuit as defined in claim 5 further comprising a fourth diode connected across a second portion of said resistance element, said third and fourth diodes being poled oppositely.

7. A circuit as defined in claim 4 wherein said resistance element is a potentiometer, and further comprising fifth and sixth diodes connected serially in opposition and across the ends of the potentiometer, the adjustable terminal of the potentiometer being connected to the junction of said diodes.

* * * * *